UNITED STATES PATENT OFFICE.

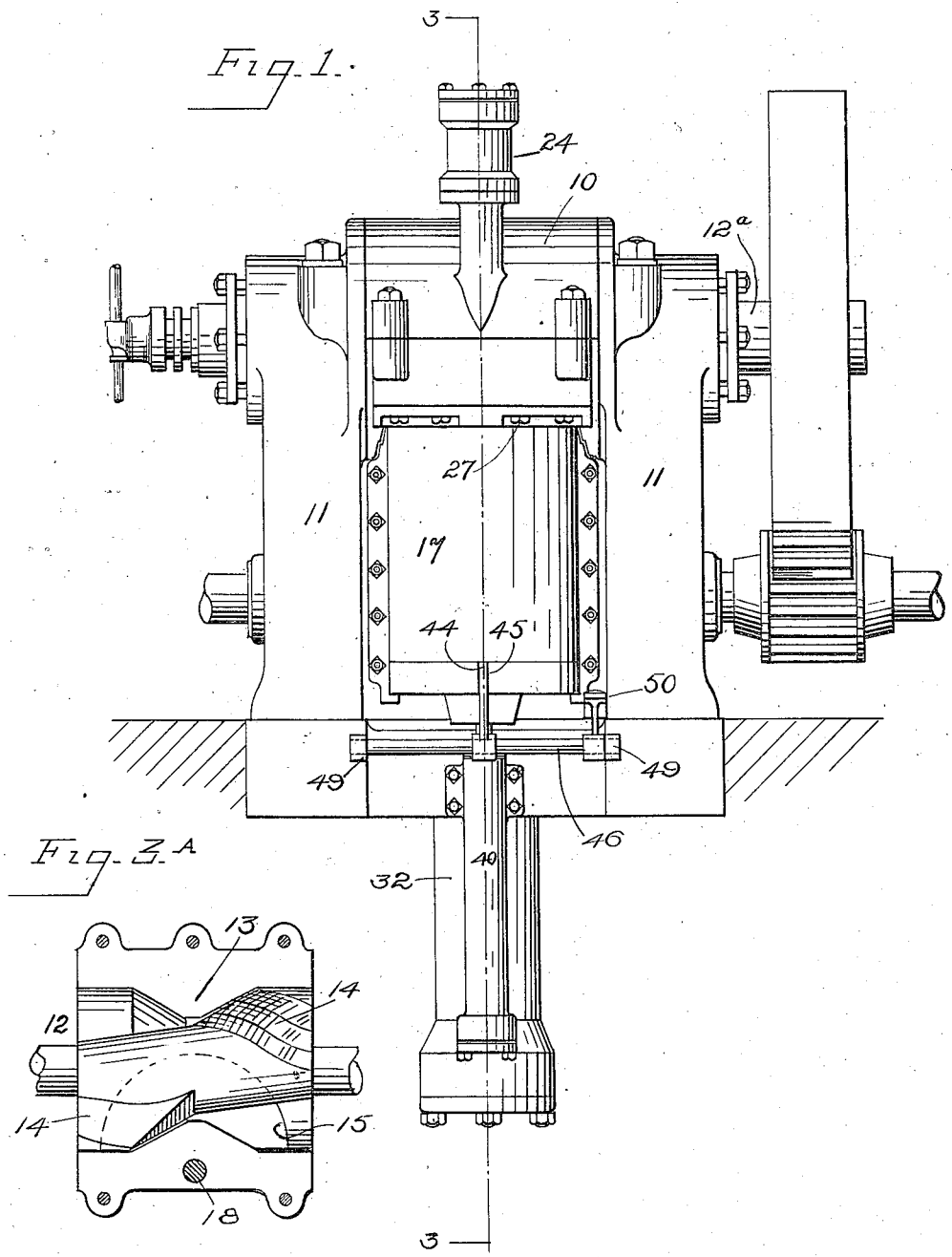

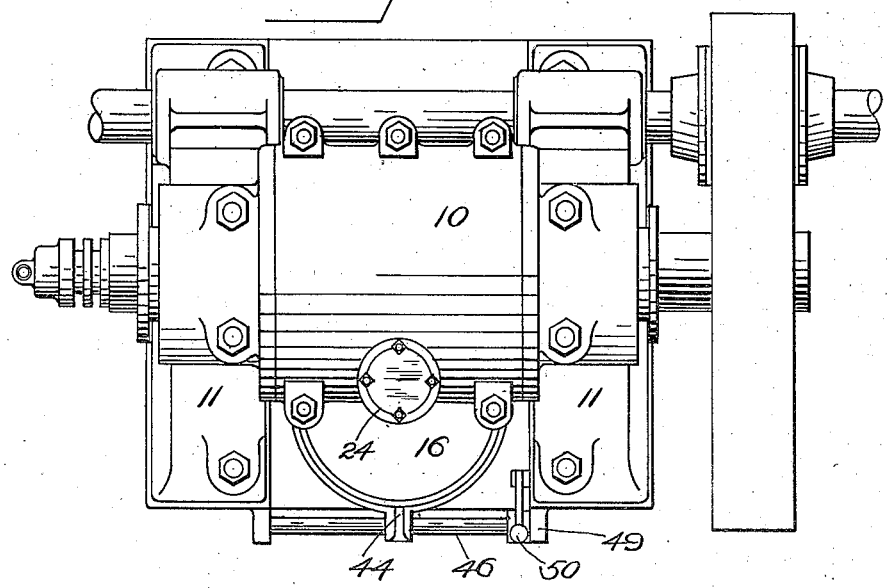
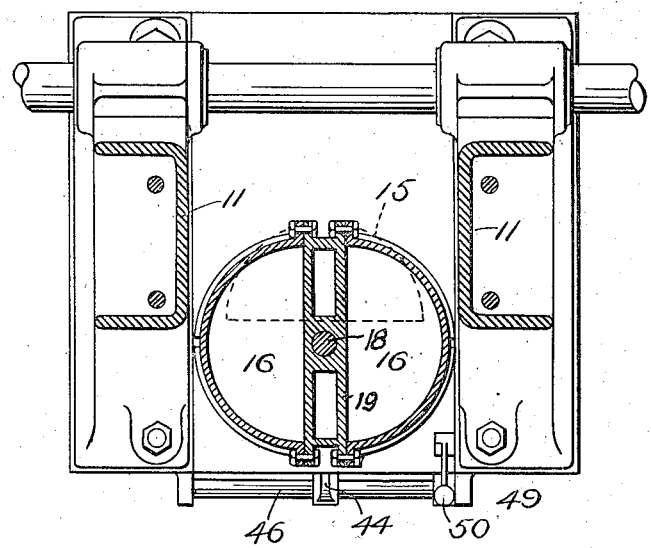

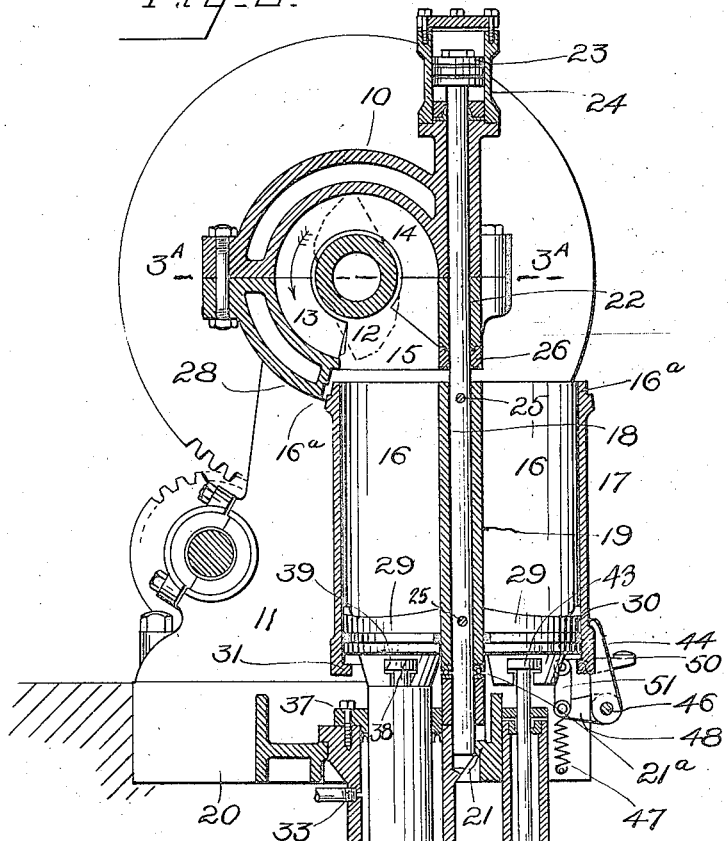
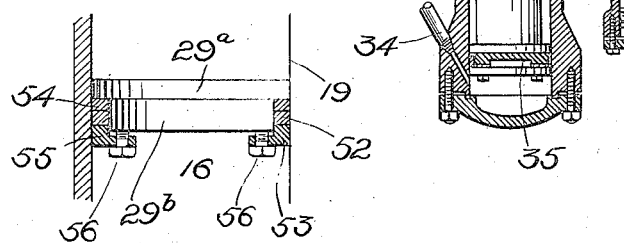

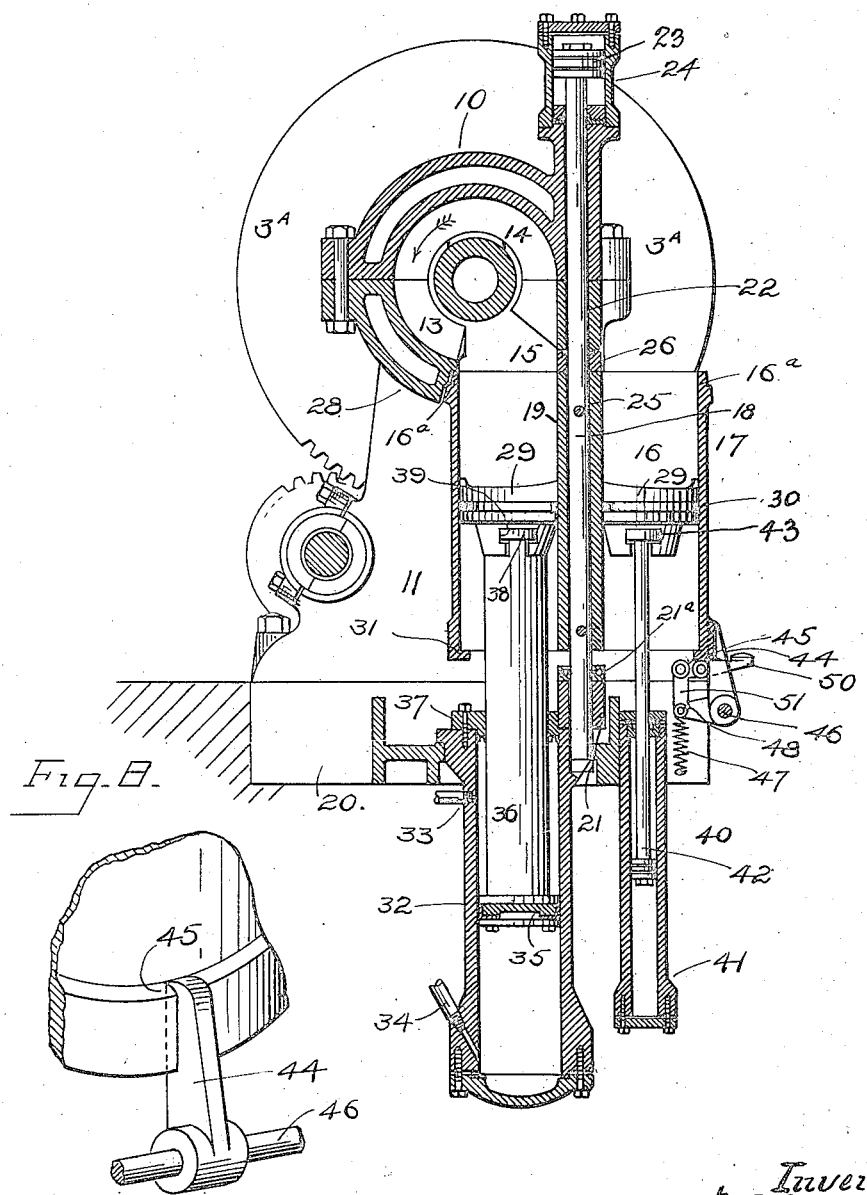

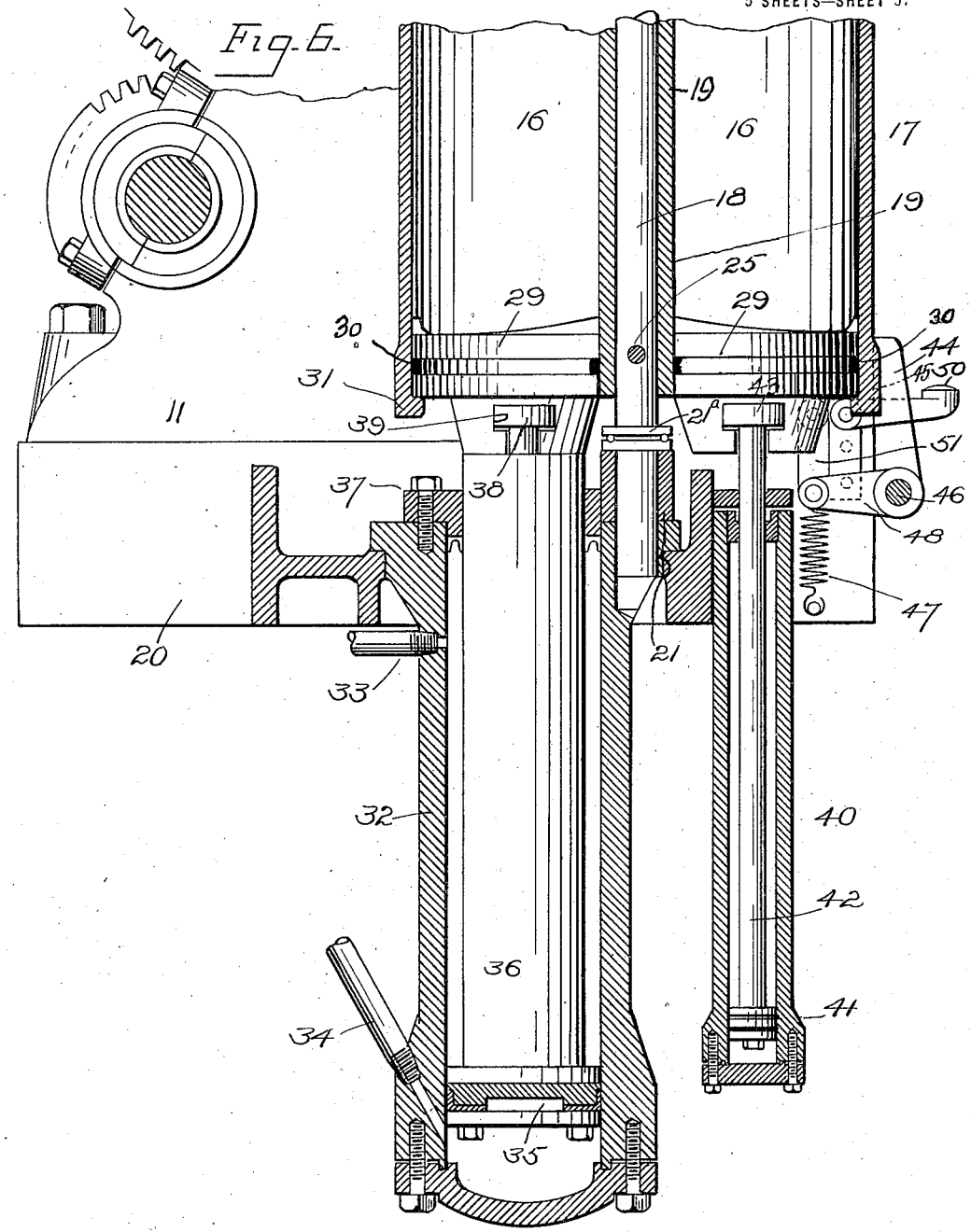

DAVID R. BOWEN AND CARL F. SCHNUCK, OF ANSONIA, CONNECTICUT, ASSIGNORS TO FARREL FOUNDRY AND MACHINE COMPANY, OF ANSONIA, CONNECTICUT, A CORPORATION OF CONNECTICUT.

MACHINE FOR TREATING RUBBER AND SIMILAR MATERIAL.

1,398,765.     Specification of Letters Patent.     Patented Nov. 29, 1921.

Application filed September 25, 1917. Serial No. 193,186.

*To all whom it may concern:*

Be it known that we, DAVID R. BOWEN and CARL F. SCHNUCK, both citizens of the United States, and both residing in Ansonia, county of New Haven, State of Connecticut, have invented certain new and useful Improvements in Machines for Treating Rubber and Similar Material, of which the following is a full, clear, and exact description.

This invention relates to machines for treating rubber and similar material and it pertains especially to machines for mixing, masticating, working or kneading rubber, which is to be used for various industrial purposes. For example, our improved machine can be used to great advantage in mixing a batch composed of solid rubber chunks or fragments and a quantity of filler, or coloring matter, in powdered form. The machine is not limited in its utility to this particular application, however, for it will be found useful in mixing or kneading mixtures of various materials, of which the particles do or do not vary considerably in character, size or consistency, and reducing such mixtures to smooth, readily workable, plastic masses, in which the distribution of the several ingredients is uniform throughout.

One of the main objects which we have in view is the production of a machine of the general type indicated having improved means for charging, discharging, or both charging and discharging the mixing or working chamber of the machine or apparatus.

Another object of our invention is to furnish a machine of the type stated having what we term a magazine feed, whereby the output is considerably increased.

The invention also contemplates the production of a rubber mixer or the like, having a movable charging device, which in one position is so disposed relatively to the main part of the machine that said charging device may be very readily and conveniently filled with the material on which the machine is to operate, and which in another position is placed in communication with the mixing or working chamber so that such material can then be conveniently charged, fed or introduced into said chamber. The arrangement is such that there is a considerable increase in the facility and convenience with which the machine can be operated. Another purpose which the invention has in contemplation is the provision of a rubber mixer or the like, having a movable discharging device which can be so shifted or manipulated as to facilitate the discharge of the treated material.

Still another object of the invention is to furnish a plurality of chambers or containers for both charging and discharging the machine, said chambers or containers being so movable relatively to the main part of the machine, or such main part being so movable relatively to said chamber or containers, that one chamber or container can be charged or discharged very conveniently by the attendant or operator while another chamber or container is coöperating with the working or mixing chamber in the mixing or other operation performed by the machine.

Another object of the invention is the provision of a mixing machine having a plurality of auxiliary chambers or containers adapted to coöperate successively with the working chamber, whereby the machine may be operated with great economy of time and labor.

The invention also has in view the general improvement in construction and operation of machines of the general class to which the invention relates.

To these and other ends, the invention consists in the novel features, parts and combinations of parts to be hereinafter described and claimed.

In the accompanying drawings,

Figure 1 is a front elevation of a rubber mixing machine embodying our improvements;

Fig. 2 is a top plan view of the same;

Fig. 3 is a vertical, transverse section showing the position of the parts preparatory to charging;

Fig. 3ᴬ is a section on line 3ᴬ—3ᴬ, Fig. 3;

Fig. 4 is a view similar to Fig. 3, showing one of the auxiliary chambers or containers being discharged while the other is being used for the charging of the working chamber;

Fig. 5 is a horizontal section of the machine showing the auxiliary chambers or containers in the process of being shifted relatively to the working chamber;

Fig. 6 shows on a large scale certain parts shown in Fig. 3;

Fig. 7 is a detail hereinafter described; and

Fig. 8 is a detail of the latch for holding the auxiliary chambers or containers against displacement.

We have shown our improvements applied to a rubber mixer having a working or mixing chamber 10 supported between suitable pedestals or end frames 11, which rest on the floor. In the example shown, the working chamber is constituted by a single cylinder horizontally arranged, in which is located a central mixing element or rotor 12 (Fig. 3A) having a shaft 12a with bearings in the respective end frames. The machine may, however, comprise two or more communicating cylinders, each having a rotor therein, or it may have a still different arrangement of the main mixing or working parts without departure from the scope of our invention, which concerns itself primarily with the means for charging and discharging the chamber or space of whatever form, in which the material is worked or mixed. In order to facilitate an understanding of the description, however, it may be said that in the particular example illustrated, the working cylinder and rotor are of the general type described and claimed in our application Serial No. 191,413, the working chamber being constricted intermediate of its ends by the provision of a transverse constriction or rib 13 (Fig. 3A), and the rotor having blades 14 at opposite sides of the rib adapted to mash the plastic material against the side wall of the cylinder and to extrude such material alternately in opposite directions through the restricted extrusion space provided by the rib 13.

In the particular example shown, the working chamber is intended to be charged and discharged at the bottom through an opening 15 provided in the lower section of the chamber and communicating with the working space, and the charging and discharging device hereinafter described is adapted to coöperate with a chamber having such an opening, although the invention is not limited in all aspects to such arrangement, as the filling and discharging opening or openings may be otherwise located.

Referring now particularly to the charging and discharging mechanism, it will be observed that, in the example shown, we use a magazine charging and discharging device involving a plurality of auxiliary chambers or containers located below the opening 15 and adapted to turn together in a generally horizontal plane. The auxiliary chambers 16, of which two are provided in the present instance, are similar to each other, being formed as compartments in a generally cylindrical receptacle or magazine 17 adapted to turn about the axis of an upright shaft 18. In the example shown, the chambers 16 are created by dividing the receptacle or magazine 17 diametrically by a partition 19, through which the shaft 18 passes, each auxiliary chamber being, therefore, of substantially semi-cylindrical shape. The machine is supported on a sub-base 20, and the lower end of the shaft 18 has a bearing 21 in the sub-base, in which bearing the shaft is vertically movable for a purpose hereinafter explained. The central lower part of the partition 19 is adapted to rest on a ball bearing 21a on top of the bearing 21 so that the receptacle or magazine 17 may be readily rotated. The upper portion of the shaft 18 has a bearing 22 in the upper and lower working cylinder castings, and the extreme upper end of the shaft is provided with a piston 23 working in a vertically arranged fluid pressure cylinder 24 supported on top of the working chamber and having suitable fluid pressure connections for moving the shaft 18 vertically. The receptacle or magazine 17 is pinned to the shaft 18 by pins 25, passing through the shaft and the partition 19 so that the receptacle will be carried up and down by the shaft.

Each of the auxiliary chambers 16 is adapted to make tight contact with the opening or mouth 15 of the working chamber. For this purpose, said opening or mouth is of segmental shape, as shown by the dotted lines in Fig. 5, and it is so formed that each auxiliary chamber or container will make a tight joint therewith when such chamber or container is moved upward by the shaft 18. In the particular form shown, a bar 26 is bolted to the working chamber at the lower part thereof by bolts 27 (Fig. 1), said bar extending lengthwise of the working chamber and having an opening through which the shaft passes, said bar also preferably having tongue and groove engagement with the lower working chamber casting. The lower surface of bar 26 is adapted to seat the upper surface of the partition 19 (the bar and partition being substantially co-extensive), and when the upper surface of the partition engages the bar, the rabbeted curved rim portion 16a will snugly fit in a correspondingly shaped rabbeted rim portion on the working chamber extending along the curved edge of the opening 15 as shown at 23. It will be understood, therefore, that if one of the auxiliary chambers or containers 16 is brought into alinement with the opening 15, the upper edge of such chamber or container can be moved up to tightly engage the working chamber at all points along such upper edge, so that material contained in the auxiliary chamber or container may be charged into the working chamber, or material can be discharged from the working chamber into the auxiliary chamber, without leakage.

Each of the auxiliary chambers 16 is provided with a piston, follower or bottom 29 that is movable up and down therein. If the auxiliary chambers are of segmental cross-section, as in the example shown, the piston or follower must be shaped to correspond, but obviously the chambers might be formed as complete cylinders in the strict sense of the term, in which event, the piston 29 would be round. Each piston or follower is preferably provided with suitable packing 30 to prevent leakage. The lower end of each auxiliary chamber is open as well as the upper end, but the corresponding piston is held in the lower part of the chamber and prevented from falling out of same by a suitable stop, which may be constituted by an inwardly projecting lug 31 at the lower end of the chamber or container, underlying the piston.

In the example shown, each of the pistons is adapted to be moved up and down, when said piston is alined with the opening 15, by a relatively stationary fluid pressure mechanism preferably associated with the sub-base 20 and preferably located for the most part below the floor level. For this purpose a downwardly extending cylinder 32 may be supported suitably from the sub-base in a fixed position in substantial alinement with the opening 15, said cylinder having suitable fluid pressure connections 33—34, which it is not necessary to illustrate in detail, and being provided interiorly with a piston or plunger 35 having a large upwardly extending rod 36. This rod 36 extends at its upper end through a head 37 fixed to the upper end of the cylinder and provided with suitable packing. At its extreme upper end the rod 36 is reduced in cross-section and carries a round enlargement or disk 38 adapted to fit in an arcuate groove 39, at the lower part of each piston 29. The arrangement is such that as the receptacle 17 is rotated on its axis, the pistons 29 will successively slide into operative engagement with the disk 38. At the same time that one piston 29 is operatively engaged with the rod 36 of piston 35, the other piston 29 will be operatively engaged with the piston rod of another fluid pressure cylinder 40 arranged in front of the cylinder 32 and likewise supported from the sub-base below the floor level. The cylinder 40 has suitable fluid pressure connections which we have not considered it necessary to illustrate. It also has an interior piston 41, piston rod 42, projecting out of the upper end of the cylinder, and a disk 43 on the upper end of the piston rod similar to the disk 38 and adapted to engage the arcuate groove of each piston 29 as the corresponding container 16 is swung to the front of the machine, as shown in Fig. 3. The fluid pressure cylinder 40 is intended to discharge the containers 16 as hereinafter described, but this feature can be omitted in some instances.

In order to lock the receptacle 17 in either of two positions in which either one or the other of the chambers is alined with the opening of the working chamber, we employ a pivoted latch 44 adapted to engage either one of two diametrical notches 45 in the lower rim of the receptacle. The pivoted latch 44 is carried on a rock shaft 46 and the active end of the latch is urged in the direction of notch 45 so that it will normally engage therein by a spring 47 connecting an arm 48 on the shaft 46 with a fixed point on the machine frame. The rock shaft 46 is journaled in suitable bearings 49 on the sub-base, as shown in Fig. 1.

A pivoted treadle 50 connected by a link 51 with the arm 48 enables the latch 44 to be swung out of engagement with the notch 45 in which it rests in opposition to the spring 47, whereupon the receptacle 17 can be turned on its axis, during which operation it rests on the ball bearing 21$^a$, while the shaft 18 turns in the lower bearing 21 and in the upper bearing 22 and cylinder 24. The treadle 50 being released, the upper active end of latch 44 is pressed against the rim of the rotating receptacle and rides thereon until the other notch 45 comes into line with the latch, whereupon the receptacle is again locked in position with its other chamber 16 in line with the working chamber.

The operation of the machine will be more or less obvious from the foregoing description. Supposing the parts to be in the positions shown in Fig. 3, the machine is charged by introducing the ingredients of the batch into that chamber or container 16 which is located at the front of the machine, where it is readily accessible. In other words, the chamber 16 which is located at the right in Fig. 3, is charged from the top by pouring in the ingredients of the batch from a suitable receptacle or otherwise, the upper end of said chamber being substantially unobstructed. The latch 44 is then released in the manner previously described and the receptacle 17 is turned until the first mentioned chamber 16 comes into alinement with the opening 15 of the working chamber. The receptacle or magazine 17 can be readily turned by hand as it swings freely on the ball bearing 21$^a$ and the latch 44 keeps it from over-running as it snaps into engagement with the notch 45 of the other chamber 16 at the moment when the first chamber 16 is alined with the working chamber. The first mentioned chamber 16 being then held in exact alinement with the mouth or opening of the working chamber, fluid pressure is admitted to cylinder 24 beneath piston 23 so as to raise the shaft 18, and thereby the receptacle 17 pinned thereto by the pins 25, so that the first mentioned chamber 16 will be held in leak proof engagement with the working chamber as hereinbefore described. When the first mentioned chamber 16 comes opposite the rod 36 of piston 35, the disk 38 engages slot 39 of piston 29 in the manner previously described. While the receptacle 17 is held in the upper position by cylinder and piston 24, 23, the piston 29 in the first mentioned chamber 16 is raised to charge the working chamber by an upward movement imparted to piston 35 through suitable fluid pressure connections which are provided. As the piston 29 moves upward, it carries the material supported thereon up into the opening or mouth 15 and into the working chamber, and it holds the material in contact with the rotor throughout the mixing operation. In the particular form shown, the material is mashed against the side wall of the working chamber by the blades 14 and said blades also extrude the material alternately in opposite directions through the constricted space between the inner edge of the arcuate rib 13 and the rotor body, whereby an especially effective mixing action is produced. In the case illustrated, the rib 13 is interrupted by the opening 15, the rib being about in line with the center of the opening and having its opposite ends adjacent opposite edge portions of the opening. It will be observed that the opening 15 is slightly offset to the right from the center of the working chamber, as shown in Fig. 3, and that the direction of rotation of the rotor is counter-clockwise with respect to Fig. 3, as shown by the arrow, so that the material entering the mixing chamber assists rather than impedes the rotation of the rotor.

The mixing operation having been completed, the piston in the left hand chamber 16 (Fig. 3) is lowered to discharge the machine. The pressure in the lower part of the working chamber being relieved, the material is no longer forced through the extrusion space, but strikes against one end of the rib (the right hand end in Fig. 3), and is stripped off by the rib or otherwise ejected into the left hand chamber 16. The ejected material rests on the piston or movable bottom 29, which is lowered to the bottom of chamber 16 by manipulation of the fluid pressure connections. It then being necessary to remove from the machine the treated material contained in the left hand chamber 16, the cylinder and piston 24, 23, are operated to carry the receptacle 17 down on to the bearing 21ª and to disengage the upper edge of the lefthand chamber 16 from the mouth of the working chamber. The receptacle 17 is then free for rotation except for the latch 44 and, after said latch has been released by operation of the treadle 50, the receptacle is turned by hand through 180 degrees, whereby the positions of the two chambers are reversed. While the left hand chamber 16 is coöperating with the working chamber in the mixing operation, the right hand chamber 16 can be utilized for charging another batch of material, which is then all ready to be moved into the working chamber when the first batch has been discharged. Assuming that the chamber containing the first batch of treated material is now shifted to the right hand position shown in Fig. 3, it will be obvious that said chamber can be readily discharged while the working chamber is being charged from the other chamber 16. When either chamber is in the right hand position shown in Fig. 3, it can be emptied and filled again while the material of another batch is being forced from the other chamber 16 into the working chamber, as will be understood, and therefore no time is lost in the operation of the machine, and its output is considerably increased.

In the particular form shown, each chamber, when it is moved to the right hand or outer position, can be discharged by the fluid pressure device 40, 41, 42, 43, with which the piston 29 of said chamber is moved into coöperation as said chamber reaches the right hand or outer position and as the other chamber reaches the left hand or inner position. Fig. 4 shows the position of the parts when, for example, the left hand or inner chamber is being used for charging the mixing chamber and when the right hand or outer chamber has its piston moved up by the auxiliary fluid pressure discharging device for the purpose of moving the treated material into the upper part of said last named chamber or ejecting the material from the upper end of said chamber. After the treated material has been taken out of the right hand chamber, another batch of fresh material can easily be introduced before the mixing operation has been completed. It is easily possible, therefore, to discharge one of the chambers and fill it with a new charge during the time that the other chamber is coöperating with the working chamber in the charging of the material into the working chamber, the mixing of the material in said chamber, and the discharge of the material from said chamber into the chamber 16 positioned below the same. As a result, there is a considerable saving of time and labor in the operation of the machine.

In Fig. 7 we have shown one means for packing a piston 29ª of segmental shape similar to the pistons 29 previously described.

In this form, the piston body is reduced at its lower portion, as shown at 29ᵇ.

Straight packing 52 extends across that side of the piston in contact with the other partition 19 and is held in place by a straight angle plate 53. Curved packing 54 extending around the curved portion of the piston is held in place by a curved angle plate 55. The plates or strips 53—55 are screwed to the piston body by screws 56.

We do not limit ourselves in all phases of the invention to a machine having provision for discharging the outer auxiliary chamber by producing an upward movement of a piston or follower therein. Nor do we limit ourselves in all aspects of the invention to a construction in which separate fluid pressure devices are employed for raising and lowering the chambered receptacle or the like and for raising and lowering one of the pistons or followers for charging and discharging the working chamber. In so far as we are aware, we are the first to provide a rubber mixer or like machine wherein a plurality of chambers or containers are adapted to be brought successively into cooperation with the working chamber of the machine, and we are also the first, so far as we known, to provide a machine of the character indicated having a magazine feed, and more particularly one which provides for the loading and unloading of one chamber or compartment of the receptacle or magazine at the same time that another chamber or compartment is being used to cooperate with the working chamber. Various changes may be made in the construction illustrated and described herein without departing from the scope of the invention as defined in the claims.

Many rearrangements of the machine herein illustrated and described will occur to those skilled in the art as being within the scope of our invention. For example, in the case of a machine having two mixing or working cylinders, a single container might be used for either charging or discharging both working chambers, or it could be used for both charging and discharging both chambers. It will be obvious, furthermore, that by providing a movable magazine, like that shown, at the top of the mixing chamber, in addition to the one at the bottom, the upper magazine could be used for discharging. Furthermore, it is not necessary in all cases that the machine be provided with a plurality of charge-containers as our invention contemplates certain improvements in the arrangement and mounting of a single charge-container as hereinbefore described.

We do not claim broadly herein a rubber mixer or like machine having an extrusion opening and means for forcing the material through said opening alternately in opposite directions, as claimed in our application Serial No. 191,413; neither do we claim broadly herein a machine of the character described having a working chamber with an opening in the lower part thereof and a piston or follower adapted to operate in said opening for forcing the material against the rotor and for permitting discharge of the machine, as claimed in our application Serial No. 192,030.

What we claim is:

1. In a rubber mixer or like machine, a working chamber, and a plurality of auxiliary chambers or containers cooperating successively therewith.

2. In a rubber mixer or like machine, a working chamber, and a plurality of auxiliary members movable into cooperation therewith.

3. In a rubber mixer or like machine, a working chamber, and a plurality of auxiliary chambers successively movable into communication therewith.

4. In a rubber mixer or like machine, a mixing chamber, and a magazine having a plurality of auxiliary chambers, said mixing chamber and magazine being relatively movable to bring the auxiliary chambers successively into cooperation with the mixing chamber.

5. A rubber mixer or like machine provided with a magazine feed, said magazine having a plurality of chambers.

6. A rubber mixer or like machine having a working chamber, and a magazine having a plurality of charge-containing chambers.

7. In a rubber mixer or like machine, a working chamber having a rotor therein, said chamber provided with an opening, and a charge-containing device for cooperation with said chamber comprising an auxiliary chamber movable relatively to said opening.

8. In a rubber mixer or like machine, a working chamber having an opening, and a charge container adapted to communicate with said opening, said container mounted to move toward and away from said opening.

9. A rubber mixer or like machine having the elements set forth in claim 8, wherein the movement of the chamber or container is in a lateral direction relatively to the working chamber opening.

10. In a rubber mixer or like machine, a mixing chamber, and a charging device for said chamber comprising a magazine with compartments successively movable into communication with said chamber.

11. In a rubber mixer or like machine, a working chamber, a movably mounted container arranged exteriorly thereof but communicating therewith and adapted to hold and charge the material.

12. In a rubber mixer, a working chamber having an opening in its lower portion, a laterally movable container adapted to communicate with said working chamber by way of said opening, and means for forc- 13. In a rubber mixer or like machine, a working chamber having an opening, a movably mounted container adapted to communicate with said opening and having a movable bottom element, and means for operating said bottom element.

14. In a rubber mixer or like machine, a working chamber, a rotor therein, said chamber having an opening in its side wall, and a laterally movable charging container adapted to communicate with said working chamber by way of said opening.

15. In a rubber mixer or like machine, a working chamber, a magazine having compartments with movable followers, said compartments adapted to communicate successively with said working chamber, and means for actuating the follower of each compartment as said compartment communicates with said working chamber.

16. In a machine of the character described, a working chamber having an opening in its lower portion, a magazine below said working chamber having compartments adapted to communicate successively with said working chamber by way of said opening, movable followers or pistons in the respective compartments, and means for operating said followers or pistons.

17. In a machine of the character described, a magazine having a plurality of compartments, movable pistons or followers therein, and means for actuating said followers successively.

18. In a machine of the character described, a working chamber, a movable magazine having a plurality of compartments adapted to communicate with said chamber successively, movable followers mounted in the respective compartments, and means for operating each follower when its compartment has been alined with the working chamber.

19. A rubber mixer or like machine having the elements set forth in claim 18 wherein the follower-operating means is actuated by fluid pressure.

20. In a machine of the character described, a working chamber, and a movable magazine located beneath said chamber and having a plurality of compartments.

21. In a machine of the character described, a working chamber for the mastication or mixing of the rubber or like material, a rotor in said chamber, said chamber provided at its lower part with an opening, and a magazine mechanism movable relatively to said working chamber for charging and discharging said chamber.

22. A rubber mixer or like machine having a working chamber, a charge container adapted to communicate with the working chamber, and a second charge container adapted to be charged or discharged while the first container is in communication with the working chamber.

23. A rubber mixer or like machine having a working chamber, a charge container adapted to communicate with the working chamber, and a second charge container adapted to be charged or discharged while the first container is in communication with the working chamber, said charge containers movable to reverse their positions with respect to the working chamber.

24. A rubber mixer or like machine having a working chamber, a charge container adapted to communicate with the working chamber, and a second charge container adapted to be charged or discharged while the first container is in communication with the working chamber, said charge containers turnable as a unit to reverse their positions with respect to the working chamber.

25. In a rubber mixer or like machine, a movable charging magazine.

26. In a rubber mixer or like machine, a movable discharging magazine having a plurality of compartments.

27. In a rubber mixer or like machine, a working chamber, and a movable magazine for both charging and discharging said chamber.

28. In a rubber mixer or like machine, a rotary charge-containing magazine.

29. In a rubber mixer or like machine, a mixing chamber, and a rotary magazine having charge-containing compartments adapted to communicate successively with said mixing chamber.

30. In a rubber mixer or like machine, a working chamber, a rotor therein, and a rotary magazine having compartments adapted to communicate successively with said working chamber at the lower part of the latter.

31. In a rubber mixer or like machine, a working chamber, a rotor therein, a rotary magazine having a plurality of compartments with movable followers therein, and means for operating said followers successively.

32. In a rubber mixer or like machine, a working chamber having an opening in the lower portion thereof, a rotary magazine having compartments adapted to communicate successively with said chamber by way of said opening, movable followers in said compartments, and means for actuating each follower when its compartment is in communication with the working chamber.

33. In a rubber mixer or like machine, a working chamber having an opening in the lower portion thereof, and a charge container movable up and down beneath said opening and adapted to communicate therewith.

34. In a rubber mixer or like machine, a working chamber having an opening in the lower portion thereof, and a container adapted to communicate with said opening, said container movable laterally with respect to said opening, a movable follower or piston in said container, and means for operating said follower or piston.

35. In a rubber mixer or like machine, a working chamber, and a charging device including a rotary magazine, said magazine mounted to move longitudinally of its axis.

36. In a rubber mixer or like machine, a working chamber having an opening, and a charge container movable toward and away from said opening and also movable laterally relatively to said opening.

37. In a rubber mixer or like machine, a working chamber, a rotor in said chamber, said chamber having an opening in the lower portion thereof, and a charge container beneath said working chamber having both a longitudinal and a lateral movement relatively to said opening.

38. In a rubber mixer or like machine, a working chamber having an opening, a movable charge container, means whereby said container may be moved into alinement with said opening, means for holding said container in leak-proof contact with said opening, and means for delivering the charge of said container into said working chamber.

39. In a rubber mixer or like machine, a working chamber having an opening, a laterally movable container adapted to move into alinement with said opening, means for moving said container toward said opening and holding it in tight engagement with the rim of said opening, a movable follower in said container, and means for operating said follower.

40. In a rubber mixer or like machine, a working chamber having an opening, a container movable laterally with respect to said opening and adapted to be alined therewith so as to communicate with said working chamber, and means for holding said container in alinement with said opening.

41. In a rubber mixer or like machine, a working chamber having an opening, a container movable laterally with respect to said opening and adapted to be alined therewith so as to communicate with said working chamber, and a latch for holding said container in alinement with said opening.

42. In a rubber mixer or like machine, a working chamber having an opening in its lower portion, a magazine below said chamber mounted to turn in a horizontal plane and having upwardly opening compartments adapted to move successively into alinement with said first opening, means for moving the magazine vertically, and means for discharging into the working chamber the material which is in the compartment in communication therewith.

43. In a rubber mixer or like machine, a working chamber having an opening in its lower portion, and a rotary magazine having upwardly opening compartments adapted to move into alinement with the opening of said chamber.

44. In a rubber mixer or like machine, a working chamber having an opening in its lower portion, and a rotary magazine having upwardly opening compartments adapted to move into alinement with the opening of said chamber, one of said compartments having a position in which a charge may be placed therein from the top while another compartment is in communication with said working chamber.

45. In a rubber mixer or like machine, a working chamber, and a combined charging and discharging magazine for said chamber.

46. In a rubber mixer or like machine, a working chamber, a plurality of charge containers movable as a unit to carry them successively into and out of coöperation with said chamber, and movable followers in said charge containers for charging and discharging the machine.

47. In a rubber mixer or like machine, a working chamber, a magazine of charge containers having movable bottoms or followers, means for actuating the follower of one charge container to charge and discharge the chamber, and means for actuating the follower of another charge container to discharge the material from said container.

48. In a rubber mixer or like machine, a working chamber, a rotor therein having blades for mixing the material, a magazine of charge containers movable to bring said containers successively into communication with said working chamber, said charge containers provided with movable bottoms or followers, and means for operating on each follower when its charge container is in communication with the working chamber to charge and discharge said chamber.

49. A rubber mixer or like machine having a working chamber and a movable container for positively discharging the machine.

50. A rubber mixer or like machine having a mixing chamber, a charge container, and means mounting the charge container for movement toward and away from the mixing chamber.

51. A rubber mixer or like machine having a mixing chamber, and a container movable toward the machine to carry fresh material to it and movable away from the machine to carry away the treated material.

52. In a rubber mixer or like machine, a mixing chamber, a charging device for said chamber including a container and a follower therein, said container with its follower being movable relatively to the mixing chamber.

53. In a rubber mixer or like machine, a mixing chamber having an opening, a container movable toward and away from said opening for discharging the machine, and means for discharging said container.

54. A rubber mixer or like machine having a working chamber, and a magazine of containers movably mounted relatively to said working chamber for receiving the discharged material.

55. In a rubber mixer, a working cylinder, a rotor therein, and a charging cylinder set transversely with respect to the working cylinder, and communicating with an opening in the periphery of the working cylinder, said charging cylinder being on that side of the rotor with respect to the direction of rotation of the same, that the incoming material assists rather than retards the movement of the rotor.

56. In a rubber compounding machine, a working chamber, a movably mounted exterior charge container, and means for causing the material to move out of said charge container into the working chamber.

57. In a rubber compounding machine, a working chamber having a discharge opening at the lower part thereof, a rotor in said chamber, means movably mounted beneath the discharge opening for carrying away the treated material and discharge means for said movably mounted means.

58. In a rubber compounding machine, a working chamber having a discharge opening in its lower part, a rotor in said chamber, and a removably mounted container beneath the chamber for receiving and carrying away the treated material from the discharge opening and discharge means for said movably mounted means.

59. In a rubber mixing machine, material receiving means including a receptacle, and positively acting discharge means for said receptacle.

60. A rubber compounding machine having a rotor, and likewise provided with means independent of the rotor for positively forcing the treated material out of the machine.

In witness whereof we have hereunto set our hands on the 19th day of September, 1917.

DAVID R. BOWEN.
CARL F. SCHNUCK.